(12) United States Patent
Harakaly

(10) Patent No.: US 12,475,334 B2
(45) Date of Patent: Nov. 18, 2025

(54) DEVICES, SYSTEMS AND METHODS RELATING TO ARTICLE AUTHENTICITY VERIFICATION

(71) Applicant: Robert Harakaly, London (GB)

(72) Inventor: Robert Harakaly, London (GB)

( * ) Notice: Subject to any disclaimer, the term of this patent is extended or adjusted under 35 U.S.C. 154(b) by 0 days.

(21) Appl. No.: 18/527,520

(22) Filed: Dec. 4, 2023

(65) Prior Publication Data

US 2024/0111971 A1 Apr. 4, 2024

Related U.S. Application Data

(63) Continuation of application No. PCT/EP2022/064881, filed on Jun. 1, 2022.

(30) Foreign Application Priority Data

Jun. 2, 2021 (GB) ...................................... 2107913

(51) Int. Cl.
*G06K 7/08* (2006.01)
(52) U.S. Cl.
CPC .................................... *G06K 7/082* (2013.01)
(58) Field of Classification Search
CPC .... G06K 7/082; B42D 25/369; B42D 25/305; G09F 3/0335; G09F 3/10
See application file for complete search history.

(56) References Cited

U.S. PATENT DOCUMENTS 5,988,500 A * 11/1999 Litman .................... G07D 7/04
235/491
2005/0242956 A1* 11/2005 Sorkine .................. G01V 15/00
235/493

FOREIGN PATENT DOCUMENTS

EP          0 824 242 A2    2/1998
WO          03/017192 A1    2/2003

OTHER PUBLICATIONS

International Search Report issued for International Patent Application No. PCT/EP2022/064881 mailed on Sep. 13, 2022.

* cited by examiner

*Primary Examiner* — Matthew Mikels
(74) *Attorney, Agent, or Firm* — Myers Wolin, LLC

(57) ABSTRACT

Authentication devices, systems and methods are provided, where an authentication device is applied to an article to be authenticated. The authentication device generates a magnetic signature that is converted into a unique digital value. The digital value is typically used to query an authentication ledger.

19 Claims, 1 Drawing Sheet

DEVICES, SYSTEMS AND METHODS RELATING TO ARTICLE AUTHENTICITY VERIFICATION

CROSS REFERENCE TO RELATED APPLICATIONS

This application is a continuation application under 35 U.S.C. § 120 of International Application PCT/EP2022/064881 filed Jun. 1, 2022, which claims priority to GB Application 2107913.2 filed Jun. 2, 2021, the contents of each being incorporated by reference herein.

FIELD OF THE INVENTION

The present invention relates to devices, systems and methods relating to authenticity verification. In particular, the present invention relates to authenticating physical articles by applying an authentication device to them, the authentication device generating a unique magnetic signature that can be reliably read over a range of conditions.

BACKGROUND TO THE INVENTION

It is desirable to safeguard against the counterfeiting, forgery or otherwise general misuse of valuable physical articles, such as documents, artworks (e.g. paintings or sculptures), heirlooms, and luxury items such as wines, fragrances, vehicles and the like.

In many cases, this is achieved via introducing an authenticity element to the article that is difficult to forge. For example, items may be signed by an artist, watermarked, or provided with security features such as holograms, security threads and the like.

However, such authenticity elements can often be obtrusive, particularly when they are visible on the article, and so detract from the aesthetic or functional enjoyment of the article.

Such easily inspectable authenticity elements, whilst providing a convenient means to check the authenticity of the article, also allow inspection by would-be forgers to reproduce the authenticity element, and so facilitate in the generation of a convincing forgery.

Furthermore, such authenticity elements do not necessarily allow the provenance or ownership of an article to be verified. Accordingly, authentic articles can still be stolen, and purchased by third parties unknowingly. Whilst records may be kept of the ownership of an article, these are either not easily publicly accessible, or otherwise can be easily falsified.

Accordingly, there is a desire to provide a means of verifying the authenticity of an article that is highly resistant to theft and forgery, that is unobtrusive and is easily checkable.

It is against this background that the present invention has been conceived.

SUMMARY OF THE INVENTION

According to a first aspect of the present invention there is provided an authentication device comprising at least one or a combination of the features recited in the accompanying claims.

Preferably, the authentication device is arranged to generate a unique magnetic signature when interrogated with a magnetic reader. Preferably, the authentication device comprises a plurality of magnetically-responsive microwires. Preferably, the microwires differ from one another and so are heterogeneous. Preferably, the authentication device comprises a substrate. The microwires may be held across the substrate. Preferably, the microwires are held in a substantially fixed position relative to one another and/or the substrate. The microwires may be held in an arrangement that is unique to the authentication device. Preferably, the microwires differ from one another based on their magnetic properties.

There may be 2 to 20 microwires in an authentication device. Preferably, there are 3-15 microwires in an authentication device. More preferably, there are 5-10 microwires in an authentication device.

Preferably, the microwires differ from one another by length. Preferably, the microwires have a thickness of 150 microns or less. More preferably, the microwires have a thickness range of 10-100 microns. More preferably, the microwires have a thickness range of 30-100 microns. Preferably, the microwires differ from one another by their chemical composition. Preferably, the microwires comprise a ferromagnetic material. Preferably, the ferromagnetic material contains approximately, by atomic percentage:

(A)
   Iron: $(77.5-x)$ %
   Nickel or Cobalt: $x$ %
   Silicon: 7.5%
   Boron: 15%
   where $x<40$.
or
(B)
   Iron: $(76-x)$ %
   Niobium: $x$ %
   Silicon: 11%
   Boron: 13%
   where $x<3.5$.

Preferably, the microwires are positioned relative to one another so that at least a pair of microwires magnetically interfere with one another during interrogation by a magnetic reader.

Preferably, the microwires are provided with a protective coating. The protective coating may be in the form of a glass coating.

Advantageously, the protective coating substantially prevents the microwires from changing their magnetic response, for example due to corrosion, or other reactions with their surroundings. Preferably, the protective glass coating is provided via application of the Taylor-Ulitovski process.

Preferably, the authentication device comprises a sheet-like construction. Ideally the authentication device is substantially thin and flat. Advantageously, this facilitates unobtrusive application to a flat article to be authenticated such as a document or painting. Specifically, the authentication device may be less than 1 mm thick.

Preferably, the authentication device presents a scanning zone having an area of less than 20 $cm^2$. Advantageously, this allows a handheld reader to be used in a single-location scan. Scanning without translational relative movement between the reader and the authentication device can advantageously minimise scan errors.

Preferably, the authentication device comprises an adhesive layer to allow the authentication device to be stuck to an article to be authenticated. The authentication device may comprise a peel-off backing that temporarily covers the adhesive layer.

Preferably, the authentication device is in the form of an adhesive label.

Preferably, the authentication device comprises a markable upper surface. The upper surface is preferably adapted to be receptive to pigments.

According to a second aspect of the present invention there may be provided an article to which the authentication device of any preceding claim is applied.

According to a third aspect of the present invention, there may be provided an authentication system. The authentication system may comprise an authentication ledger.

The authentication system may comprise an authentication device. The authentication device may be suitable for application to an article to be authenticated. Preferably, the authentication device being arranged to generate a reliable unique magnetic signature when interrogated with a magnetic reader.

The authentication device may accord with the first aspect of the present invention.

The authentication system may comprise a magnetic reader for reading the magnetic signature of the authentication device.

The authentication system may comprise a convertor for converting the read magnetic signature into a digital value. The digital value may be used to query the authentication ledger. Accordingly, a determination of the authenticity of an article can be made.

Preferably, the authentication ledger is a distributed ledger. Preferably, the authentication ledger is a cryptographically-secure, private or publicly accessible ledger. Preferably, the authentication ledger is implemented using blockchain technology.

The authentication system may further comprise a record management module. The record management module may be configured to update the authentication ledger with an association between the digital value and auxiliary data. The auxiliary data may comprise user-specified data, such as provenance data or ownership data. This association thereby allows authentication of an article to which the authentication device is applied. The record management module may be implemented in a mobile device, for example as an application executed on the mobile device.

Preferably, the record management module is configured to generate a token that encodes the digital value and the associated auxiliary data. The record management module may be configured to store the token in the authentication ledger.

Preferably, the authentication ledger is configured to cryptographically restrict access to a first set of transactional function performable on the token. The first set of transactional functions may include adding a new owner of an article associated with the token.

Preferably, the reader is a portable, handheld reader. The reader may be battery powered.

Preferably, the reader comprises a magnetic interrogation component configured to apply a magnetic field for interrogating the authentication device. The applied magnetic field may have predetermined and/or regular characteristics. For example, the magnetic field strength may repeatedly rise and fall in the same way over a period. Preferably, the magnetic field strength rises and falls uniformly over time. This typically defines a triangular waveform. Advantageously, this allows a more reliable response from the authentication device.

A wide range of applied magnetic field frequencies may be used. However, it is particularly convenient and practical to use a magnetic field frequency of between 300 Hz and 2 kHz. More preferably, the magnetic field frequency lies within the range 300 Hz and 1 kHz.

The reader may be configured and arranged to rotate the magnetic field relative to an authentication device. The rate of rotation may be predetermined. Advantageously, this allows a more sophisticated reading of the magnetic signature of the authentication device. This is due to the magnetic response from microwires within the authentication device being dependent on alignment with the magnetic field.

Preferably, the reader comprises a magnetic sensor configured and arranged to measure the response of the authentication device to interrogating magnetic field, the response including a magnetic signature that is unique to the authentication device.

Preferably, the magnetic signature comprises a plurality of pulses, the amplitude and distribution of which are dependent on the arrangement of the microwires within the authentication device.

Preferably, the duration of a majority of the pulses is less than 1% of the duration of a period of the interrogating magnetic field.

Preferably, the system further comprises a signal processor configured to determine the amplitude of each pulse relative to a maximum amplitude pulse within the response. The signal processor may be implemented in software, hardware or a combination of the two.

Preferably, the convertor is configured to convert the read magnetic signature into a digital value depending on the relative amplitude and distribution of the pulses within the response.

Preferably, the system may comprise an ancillary authentication marker. The ancillary authentication marker is ideally machine readable, and may be in the form a QR code, for example. Preferably, the ancillary authentication marker specifies the type of authentication device and/or conditions under which the authentication device should be read. For example, the ancillary authentication marker may include the authentication device version or generation. Accordingly, the successful scanning of the authentication device can be simplified.

According to a fourth aspect of the present invention there may be provided a method of authenticating an article. The method may comprise at least one of:

applying an authentication device to an article to be authenticated, the authentication device being arranged to generate a reliable unique magnetic signature;

reading the magnetic signature of the authentication device;

converting the read magnetic signature into a digital value; and using the digital value to query an authentication ledger.

The authentication device may accord with that of the first aspect of the present invention.

Further aspects of the present invention may reside in components or sub-components of the authentication device of the first aspect, the system of the third aspect and/or steps of the method of the fourth aspect of the invention. For example, a further aspect may reside in the microwires of the device of the first aspect, or the reader of the system of the third aspect.

Thus, it will be understood that features and advantages of different aspects of the present invention may be combined or substituted with one another where context allows. Furthermore, such features may themselves constitute further aspects of the present invention.

BRIEF DESCRIPTION OF THE DRAWINGS

In order for the invention to be more readily understood, embodiments of the invention will now be described, by way of example only, with reference to the accompanying drawings in which.

SPECIFIC DESCRIPTION OF THE PREFERRED EMBODIMENTS

Figure 1:
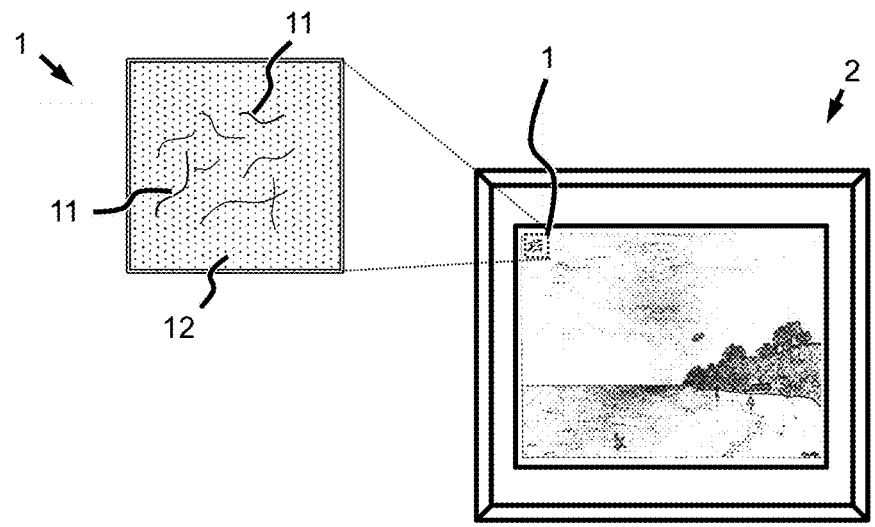
FIG. 1 is a schematic diagram of an authentication device of an embodiment of the present invention, the authentication device being applied to an article to be authenticated.

FIG. 1 is a schematic diagram of an authentication device 1 of an embodiment of the present invention, applied to an article 2 to be authenticated, the article 2 being in the form of a painted artwork 2. FIG. 1 depicts the authentication device 1 in position within the artwork 2, and also an enlarged view of the authentication device 1, separate from the artwork 2.

In the present embodiment, the authentication device 1 is in the form of a thin adhesive label, having a thickness of less than 1 mm, that is applied to a canvas on which the artwork is subsequently painted. The authentication device 1 is 3 cm wide and 3 cm long, but it will be appreciated that, in other embodiments and variants, the authentication device 1 can have other dimensions. Nonetheless, the sizing of the authentication device 1 allows its unobtrusive application to the canvas on which the artwork is subsequently painted, but also allow convenience authenticity verification via a scan as will be described below.

In alternative embodiments, the authentication device 1 may be embedded within the canvas itself, or be affixed to the rear of the canvas, assuming an artwork has already been produced. In further alternatives, the authentication device may be applied to other articles.

In the present embodiment, the authentication device 1 comprises a plurality of microwires 11, that are glued in place across an underlying substrate 12 which is in the form of a relatively strong, flexible sheet material such as polyvinyl chloride or paper. The microwires 11 are generally of a thickness in the range 10-100 microns.

Figure 2:
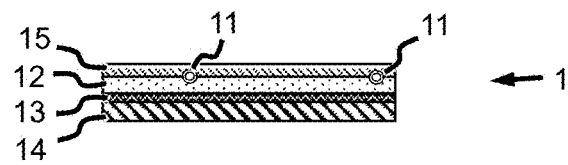
FIG. 2 is a schematic cross-sectional view of the authentication device of FIG. 1.

Referring to FIG. 2, which is a schematic cross-sectional view of the authentication device 1, the underside of the substrate 12 is coated with an adhesive layer to allow the authentication device 1 to be stuck to the article 2. Prior to being affixed to the article 2, the authentication device 1 is provided with a peel-off layer 14 that initially covers the adhesive layer 13, preventing the authentication device 1 becoming unintentional stuck with its surroundings. In use, the peel-off layer 14 is removed by a user to reveal the adhesive layer 13 to allow fixing of the authentication device 1 to an article 2 to be authenticated.

The authentication device 1 further comprises a top layer 15 which presents an upper surface of the authentication device 1. The top layer 15 comprises paper, which is markable, and in particular suitable for receiving paints in a similar way as the canvas of the artwork 2. This facilitates production of the artwork 2, as the authentication device 1 can be painted over without significantly affecting the normal way an artist would paint over the canvas. The microwires 11 are effectively sandwiched between the top layer 15 and the substrate 12, these three components of the authentication device 1 being permanently glued to one another.

In certain alternatives of the present embodiment, the top layer 15 of the authentication device 1 may be absent, with paint of an artwork being applied directly over the microwires 11 and substrate 12, and the drying of the paint encasing and protecting the microwires 11. In such alternatives, flexibility may be conferred on the relative positioning of the microwires 11 until they have been set into position. In further alternatives, an artist may adhere microwires directly onto an artwork, and then cover the microwires. An example may be where microwires are applied directly under a surface coating of a sculpture.

Each microwire is primarily constructed from a ferromagnetic material, the exact chemical composition of which normally varies from another microwire. Generally, it is preferred that the chemical composition of the ferromagnetic material of each microwire is an alloy which retains stable magnetic response characteristics over a range of conditions that are to be typically encounter by an article 2 to which the authentication device 1 is applied. For example, artwork is generally kept at room temperature, but this may vary, for example from 3 to 30 degrees Celsius. The ferromagnetic material is ideally an amorphous, or microcrystalline alloy optionally with bistable magnetic behaviour.

It has been empirically determined that such an ideal alloy contains approximately, by atomic percentage:

(A)
Iron: $(77.5-x)$ %
Cobalt: $x$ %
Silicon: 7.5%
Boron: 15%
where $x<40$.

This provides the microwires with reliable magnetic response characteristics as will be discussed below. Variation of x for each microwire 11 nonetheless enables variations in magnetic responses from each microwire.

A similar affect may be achieved by using microwires having different chemical compositions to (A), as would be apparent to those skilled in the art. For example, it is envisaged that nickel may be able to replace cobalt in the above definition, at least in part. In other alternatives, niobium may replace cobalt, at least in part, providing the atomic percentages of the other elements are altered, for example as follows:

(B)
Iron: $(76-x)$ %
Niobium: $x$ %
Silicon: 11%
Boron: 13%
where $x<3.5$.

Other chemical compositions may also be used

To stabilise the magnetic response of microwires 11, it is preferred that they are covered by a coating that insulates the microwires from degradation, for example, due to effects such as corrosion. In certain preferred embodiments, the microwires 11 are glass coated, for example via application of the Taylor-Ulitovski process.

Microwire length is also a variable that allows differences in magnetic responses. The length of each microwire is typically less than a few centimetres.

Additional variability in the magnetic response can be achieved via positioning of the microwires 11. The microwires 11 are randomly, or pseudo-randomly scattered across the substrate 12, and may overlap with one another. This can cause magnetic interference between microwires 11. These qualities of construction of the authentication device 1 further reduce the possibility of such a device being fraudulently reproduced.

Accordingly, the authentication device 1 is detectably different from every other authentication device, due to the variability of the magnetic response elicited by slight changes in the position, length and composition of each microwire 11.

Figure 3:
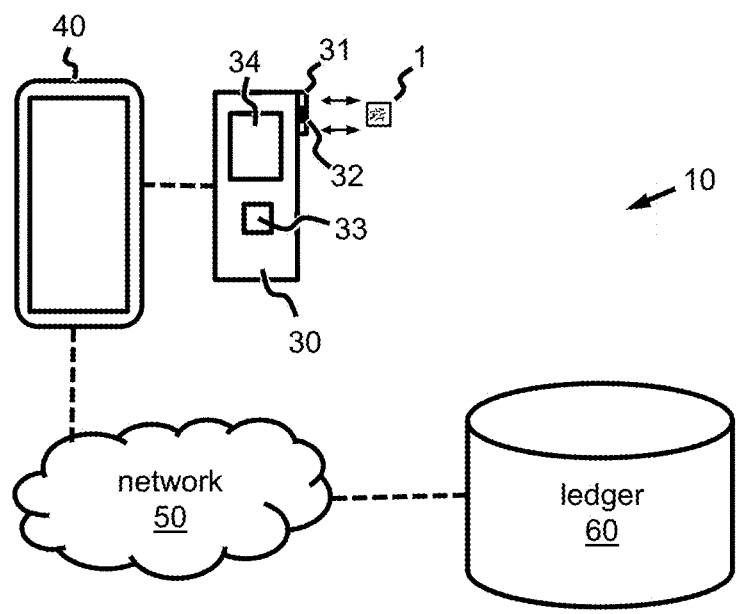
FIG. 3 is a schematic overview of an authentication system of an embodiment of the present invention, the system comprising the authentication device of FIG. 1.

FIG. 3 shows a schematic overview of an authentication system 10 according to an embodiment of the present invention, the system comprising the authentication device 1. The system 10 comprises a magnetic reader 30, a mobile device 40, a network 50, and an authentication ledger 60.

The reader 30 is a portable, battery-operated hand-held reader that is configured to read a magnetic signature of the authentication device 1. The particular arrangement of microwires 11 within the authentication device 1 generate a reliable and unique magnetic signature, and so each article 2 to which an authentication device 1 is applied can be unique marked with a magnetic signature for use in verifying its authenticity.

The reader 30 comprises a magnetic interrogation circuit that includes an interrogation coil 31, a magnetic sensor circuit that includes a pick-up coil 32, a user input 33, and a display 34. In response to a command from the user input 33, the interrogation coil 31 generates an interrogating magnetic field. This is directed, in use, towards an authentication device 1, with the reader 30 being positioned so that the magnetic field passes into it.

Simultaneously, the magnetic sensor circuit is configured to receive a magnetic field via the pick-up coil 32. This is an analogue signal.

The interrogation and pick-up coils 31, 32 each have an axis. It has been determined that it can be beneficial to offset these axes from a scan region within which the authentication device 1 is placed.

In a preferred embodiment, the authentication device 1 and components of the reader 30 are sized to allow single-point contactless scanning by the reader 30—i.e. not requiring lateral translation of the reader 30 across a scanning zone of the authentication device 1, and furthermore without close contact between the reader 30 and the article 2 to which the reader 30 is applied. This protects artworks against damage, and provides for a more convenient authentication process. Generally, the area of the scanning zone of the authentication device is less than 20 $cm^2$ and can be read at a separation distance between the reader 30 and the authentication device 1 of typically up to 10 centimetres.

In the present embodiment, the magnetic sensor coil 32 receives also a cross-talk signal from the magnetic interrogation coil 31. Additionally, the received magnetic field includes a unique set of perturbations caused by the microwires 11. These perturbations define the unique magnetic signature of the authentication device 1 and are characterised by a plurality of pulses the number, amplitude and distribution of which within the signal received by the sensor circuit are dependent on the type and arrangement of the microwires 11 within the authentication device 1.

To maximise reliability, the interrogating magnetic field has a periodic, triangular waveform, the strength of which uniformly rises and falls with a frequency of typically between 300-500 Hertz. In alternatives, the frequency may vary outside this range, but is generally preferred to be less than 2 kHz, and more preferably under 1 kHz.

In certain embodiments, the magnetic field may be rotated at a predetermined rate relative to the authentication device. For example, the reader may be configured to rotate the magnetic field. Advantageously, this allows a more sophisticated reading of the magnetic signature of the authentication device. This can lead to different classes of authentication devices and readers. A cheaper, simpler, and relatively low-security authentication device may be used for the registration and verification of the authenticity of low value articles, with a comparable reader being used in conjunction. Such a lower class of device/reader may not necessarily utilise a rotating the magnetic field, whereas a higher class would have this capability. In such a case, it is envisaged that higher class readers would be capable of reading the same and lower-class authentication devices, but not vice-versa.

Referring back to the embodiment shown in FIG. 3, the analogue signal received by the pick-up coil 32 is passed to a signal processor of the sensor circuit. The signal processor comprises an amplifier and a filter to increase the signal to noise ratio of the signal. The filter may be a FFT filter or any other electronic or software solution that allows minimise the noise. The signal is then converted into a digital form, typically used an analogue-to-digital converter (ADC).

The duration of the majority of the pulses is a small proportion of the duration of a period of the interrogating magnetic field (<0.05%) and so the location of a pulse within a period, and its position in time relative to others, can be used as variable with a large possible range of values. The output from the ADC, for example, quantises the analogue signal into a digital signal with a period length optimised for the highest precision and device capabilities (e.g. 4096 points for 12 bit precision). Each pulse is typically 6-10 points wide. Also, each pulse has a different amplitude. Accordingly, a substantially unique digital representation can be derived from the amplitude and relative spacing of the pulses.

The derivation of the digital representation from the analogue can be arbitrarily chosen in many different ways, as determined by a person skilled in the art. However, it is primarily envisaged that a cryptographic hash can be applied to the digital representation by a computation unit with the reader 30 to obtain a unique digital identifier (e.g. 40 hexadecimal character SHA1 hash, or any other) The reader 30 may provide feedback via the display 34 to indicate to a user whether an authentication device 1 has been successfully read to reliably generate such a unique digital value.

The reader 30 also comprises communication interfaces, such as USB, or a wireless (e.g. Bluetooth®, or NFC) interface with which to communicate with the mobile device 40 to pass it the digital value.

The mobile device 40 is in the form of a modern smartphone having connectivity via the network 50 to an authentication ledger 60. The digital value is used to query the authentication ledger 60—either to read data already stored in the ledger that is associated with the digital value, or otherwise to write the registration to the authentication ledger 60 by the artist. Writing to the authentication ledger 60 is, in effect, registration of relevant information that can be used to later authenticate an article. It is envisaged that an artist would first register information about their artwork in this manner.

In particular, the mobile device 40 may be used to perform a check to determine whether the digital value has previously been stored in the ledger 60. If the digital value has been previously stored, then the authentication ledger 60 may be read to determine what other data has been stored in association with the digital value. This is typically part of a verification process that occurs after a registration process.

If the digital value has not been previously stored in the ledger 60, then a registration process can take place. Specifically, a record management module of the mobile device is configured to store in the ledger 60 for the first time, an association between the digital value, and auxiliary data—such as user-specified data. Such user specified data may include provenance data or ownership data—for example, the artist of an artwork to which the authentication device 1 is applied. Auxiliary data may include metadata such as a time and date stamp.

The record management module of the mobile device 40 is typically configured to generate a token that encodes the digital value and the associated auxiliary data, and it is this token that is stored in the authentication ledger 60.

The token may include security credential information, such as that derived from a username and password, but also blockchain credentials private key or any other. In particular, the token is cryptographically secured to restrict transactions being performed on the authentication ledger 60 that are associated with the token. Notably, the updating of the ledger 60 to reflect subsequent ownership may be cryptographically restricted to a user able to provide the correct security credentials.

In certain embodiments, the ledger 60 is ideally a publicly-accessible and cryptographically-secure distributed ledger, with updates to the ledger 60 being dependent on cryptographically-verified rules being applied by the devices querying it.

Ideally, the ledger 60 is implemented using blockchain technology, and the tokens that are created and stored therein are in the form of non-fungible tokens (NFTs).

Examples of blockchain based token standards for representing and transacting with non-fungible assets in digital form include ERC-721 or ERC-1155. Accordingly, the ledger 60 may be in the form of any distributed ledger technology—ideally one that supports smart contracts, such as Ethereum, Hyperledger, Polygon or Corda.

Advantageously, this allows a physical article, such as an artwork 2 that is provided with an authentication device 1 to have an immutable digital equivalent in the form of an NFT. Thus, information such as provenance or ownership, that is stored under that NFT can be traced directly to a physical article 2. Moreover, due to the cryptographically secure way that such information is stored, it is computationally unfeasible to modify such already-stored information. Updates to ownership information can be made as an additional entry on the ledger 60, but these are restricted to those with the correct security credentials.

Furthermore, it is very difficult to reproduce the exact magnetic signature of an authentication device 1, and so difficult to create a forgery that will, when scanned by a reader 30, output the same digital value used to derive a token.

Accordingly, the invention provides a way for articles such as artworks to be registered by their creators, and thereafter the lifetime journey of such articles can be permanently and immutably tracked via recordation on the ledger 60. This also provides a way in which stolen articles can be identified, and returned to their rightful owners.

An additional advantage is that ownership of a physical article can be recorded on the ledger 60 by a token (or multiple tokens) to be split across multiple users. This opens many possibilities for articles such as artworks. For example, a consortium of users (e.g. the habitants of a town) may contribute towards the purchase and joint ownership of an artwork, with the artwork being displayed at a local museum to those users.

Although the invention has been described in conjunction with specific embodiments thereof, it is evident that many alternatives, modifications and variations will be apparent to those skilled in the art.

For example, in certain alternatives, the functionality provided by the mobile device and the reader may be combined into one unit.

In certain alternatives, an ancillary authentication marker may accompany an authentication device. The ancillary authentication marker is ideally machine readable, and may be in the form a QR code, for example. The ancillary authentication marker specifies the type of authentication device and/or conditions under which the authentication device should be read. For example, the ancillary authentication marker may include the authentication device version or generation. Accordingly, the successful scanning of the authentication device can be simplified. This can be used to differentiate between different classes of authentication devices and readers as described above.

Accordingly, it is intended to embrace all such alternatives, modifications and variations that fall within the scope of the appended claims.

The invention claimed is:

1. An authentication device arranged to generate a reliable unique magnetic signature when interrogated with a magnetic reader, the device comprising:
    a plurality of heterogeneous magnetically-responsive microwires; and
    a substrate across which the microwires are held; wherein:
        the microwires differ from one another based on their magnetic properties; and
        the microwires are held in a substantially fixed position relative to one another in an arrangement unique to the authentication device; and
    wherein the authentication device presents a scanning zone having an area of less than 20 cm$^2$.

2. The authentication device of claim 1, wherein the microwires differ from one another by at least one of length and chemical composition.

3. The authentication device of claim 1, wherein the microwires comprise a ferromagnetic material, and have a thickness of 100 microns or less.

4. The authentication device of claim 1, wherein the microwires are positioned relative to one another so that at least a pair of microwires magnetically interfere with one another during interrogation by a magnetic reader.

5. The authentication device of claim 1, wherein the microwires are provided with a protective glass coating.

6. The authentication device of claim 1, wherein the authentication device comprises a sheet-like construction that is substantially thin and flat, thereby facilitating unobtrusive application to a flat article to be authenticated such as a document or painting, the authentication device being less than 1 mm thick.

7. The authentication device of claim 1, further comprising an adhesive layer to allow the authentication device to be stuck to an article to be authenticated, wherein the device comprises a peel-off backing that temporarily covers the adhesive layer; wherein the authentication device is in the form of an adhesive label; and wherein the authentication device comprises a markable upper surface.

8. An authentication system, comprising:
    an authentication device suitable for application to an article to be authenticated, the authentication device:
        being arranged to generate a reliable unique magnetic signature when interrogated with a magnetic reader;
        comprising a plurality of heterogeneous magnetically-responsive microwires; and
        comprising a substrate across which the microwires are held; wherein:
            the microwires differ from one another based on their magnetic properties; and the microwires are held in a substantially fixed position relative to one another in an arrangement unique to the authentication device;

and wherein the system further comprises at least one of:

an article to which the authentication device is applied;

an authentication ledger that is optionally a cryptographically-secure distributed ledger;

a magnetic reader for reading the magnetic signature of the authentication device, the reader optionally being a portable handheld reader; and a convertor for converting the read magnetic signature into a digital value for use in querying the authentication ledger, and wherein the authentication device presents a scanning zone having an area of less than 20 cm$^2$.

9. The authentication system of claim 8, further comprising a record management module configured to update the authentication ledger with an association between the digital value and user-specified data, such as provenance data or ownership data, thereby to allow authentication of an article to which the authentication device is applied;

wherein the record management module is configured to generate a token that encodes the digital value and the associated user-specified data and store the token in the authentication ledger;

and wherein the token is a non-fungible token.

10. The authentication system of claim 8, wherein the reader comprises a magnetic interrogation component configured to apply a magnetic field for interrogating the authentication device; wherein the magnetic field applied by the magnetic interrogation component has predetermined characteristics.

11. The authentication system of claim 10, wherein the magnetic field applied by the magnetic interrogation component rises and falls periodically.

12. The authentication system of claim 11, wherein the magnetic field rises and falls uniformly overtime, defining a triangular waveform.

13. The authentication system of claim 10, wherein the magnetic field applied by the magnetic interrogation has a frequency of between 300 Hertz and 2 kHz.

14. The authentication system of claim 8, wherein the reader comprises a magnetic sensor configured and arranged to measure the response of the authentication device to an interrogating magnetic field, the response including a magnetic signature that is unique to the authentication device.

15. The authentication system of claim 14, wherein the magnetic signature comprises a plurality of pulses, the amplitude and distribution of which are dependent on the arrangement of the microwires within the authentication device.

16. The authentication system of claim 15, wherein the duration of a majority of the pulses is less than 1% of the duration of a period of the interrogating magnetic field.

17. The authentication system of claim 15, further comprising a signal processor configured to determine the amplitude of each pulse relative to a maximum amplitude pulse within the response.

18. The authentication system of claim 8, wherein the convertor is configured to convert the read magnetic signature into a digital value depending on the relative amplitude and distribution of the pulses within the response.

19. A method of authenticating an article, the method comprising:

applying an authentication device to an article to be authenticated, the authentication device being arranged to generate a reliable unique magnetic signature;

reading the magnetic signature of the authentication device;

converting the read magnetic signature into a digital value; and using the digital value to query an authentication ledger;

wherein the authentication device comprises:

a plurality of heterogeneous magnetically-responsive microwires; and a substrate across which the microwires are held; wherein:

the microwires differ from one another based on their magnetic properties; and the microwires are held in a substantially fixed position relative to one another in an arrangement unique to the authentication device, and wherein the authentication device presents a scanning zone having an area of less than 20 cm$^2$.

\* \* \* \* \*